(12) United States Patent
Wulz et al.

(10) Patent No.: US 6,357,733 B1
(45) Date of Patent: Mar. 19, 2002

(54) ELASTIC SPRING ELEMENT

(75) Inventors: Hans Georg Wulz, Deggenhausertal; Wilfried Becker, Siegen; Helmut Knabe, Friedrichshafen, all of (DE)

(73) Assignee: Astrium GmbH, München (DE)

( * ) Notice: Subject to any disclaimer, the term of this patent is extended or adjusted under 35 U.S.C. 154(b) by 0 days.

(21) Appl. No.: 09/530,427

(22) PCT Filed: Oct. 29, 1998

(86) PCT No.: PCT/DE98/03173
§ 371 Date: Jul. 13, 2000
§ 102(e) Date: Jul. 13, 2000

(87) PCT Pub. No.: WO99/22163
PCT Pub. Date: May 6, 1999

(30) Foreign Application Priority Data

Oct. 29, 1997 (DE) .......................... 197 47 650

(51) Int. Cl.⁷ .................................................. F16F 1/18
(52) U.S. Cl. ..................................... 267/158; 267/160
(58) Field of Search ........................ 267/158, 160; 285/41

(56) References Cited

U.S. PATENT DOCUMENTS

| | | | |
|---|---|---|---|
| 4,209,334 A | * | 6/1980 | Panzera ..................... 106/54 |
| 4,441,726 A | | 4/1984 | Uhl |
| 4,544,610 A | | 10/1985 | Okamoto |
| 4,854,765 A | | 8/1989 | Giles |
| 4,858,897 A | | 8/1989 | Irifune |
| 5,251,917 A | | 10/1993 | Chee |
| 5,332,239 A | | 7/1994 | Steinetz |
| 5,352,512 A | | 10/1994 | Hoffman |
| 5,366,255 A | * | 11/1994 | Garkawe ..................... 285/41 |
| 5,366,942 A | | 11/1994 | Ferguson |
| 5,417,441 A | | 5/1995 | Hill |
| 5,462,616 A | * | 10/1995 | Goerenz ..................... 156/85 |
| 5,678,809 A | * | 10/1997 | Nakagawa et al. ......... 267/148 |

OTHER PUBLICATIONS

Fitzer et al., *Faserverbundwerkstoffe zur Anwendung bei hohen Temperaturen*, Technische Keramik Handbuch, 2$^{nd}$ edition, pp. 91–103.

* cited by examiner

Primary Examiner—Christopher P. Schwartz
(74) Attorney, Agent, or Firm—Crowell & Moring LLP

(57) ABSTRACT

An elastic spring element includes a fiber-reinforced ceramic that is resistant to temperatures greater than 1,000° C. The fibers are in the form of endless fibers and the elastic spring element has a corrugated geometric shape. The elastic spring elements may be used for sealing a control surface against hypersonic flow.

10 Claims, 4 Drawing Sheets

ELASTIC SPRING ELEMENT

BACKGROUND AND SUMMARY OF INVENTION

The invention relates to an elastic spring element.

Special applications require elastically deformable spring elements at high temperatures above 1000° C., for example, for applying pressures to hot moving gaskets. Hot elastic gaskets are used, for example, for preventing flow through rudder gaps and hot joints during hypersonic atmospheric flight or during entry into the planet atmosphere. This situation is illustrated in FIG. 1.

The temperature of 1000° C. serves therefore as a marker, since above this temperature even high-melting metallic materials begin to creep and their elasticity suffers. At high temperatures their elasticity becomes increasingly poorer because their tensile strength sinks dramatically.

In U.S. Pat. No. 4,441,726 a high-temperature resistant seal is described. It comprises a so-called ceramic rope as the elastic element, the ceramic rope being jacketed in a braid of ceramic fibers.

In U.S. Pat. No. 5,532,239 another high-temperature resistant seal is described which is jacketed in a braid of ceramic fibers.

The invention is therefore addressed to the problem of creating an elastic spring element resistant to high temperature (>1000° C.).

The high-temperature resistant elastic spring element of the present invention made of ceramic fiber material provides an excellent solution of this problem. With the endless fiber-reinforced spring element of the present invention, moving high-temperature gaskets for temperatures above 1000° C. can be well achieved. In contrast to all metallic materials, the tensile strength of a ceramic fiber material does not decrease with increasing temperature but even increases slightly. The stiffness of the spring element thus remains even at high temperatures up to at least 1600° C. and there is no loss of spring function.

The ceramic fiber material can be made, for example, by laminating technology with the use of a matrix precursor infiltrated with endless fiber prepregs or fabrics. A green body of stable shape created by crosslinking the matrix precursor can be transformed by a subsequent pyrolysis process into the fiber-reinforced ceramic body. The production of the ceramic fiber material can also be performed by the fluid silication process from C/C materials or the chemical vapor infiltration process or a combination of these processes.

The ceramic fiber spring element of the present invention is characterized in that its shaping can be performed independently of the structural composition or stratification of the ceramic fiber material.

The fiber for the spring element of the present invention can consist, for example, of the following materials: reinforcing fibers, endless carbon fibers, or endless ceramic fibers made from oxide or nitride or carbide or silicic ceramic materials or mixed ceramics formed therefrom. The ceramic matrix may consist of carbon or oxide or nitride or boride or carbide or silicic ceramic materials or mixed ceramics formed therefrom.

The elastic element according to the invention can have, for example, a flat shaped, wavy, curved or arcuate or spiral-shaped geometrical form.

The component according to the invention can be laid free with movable ends, e.g., it can be a corrugated spring laid in a groove. It is also possible, likewise, to clamp it tightly on one or more sides or ends, e.g., be a flat spring element which is held at two opposite margins.

BRIEF DESCRIPTION OF THE DRAWINGS

The invention will be explained with the aid of examples, with reference to the drawings.

DETAILED DESCRIPTION OF THE DRAWINGS

Figure 2:
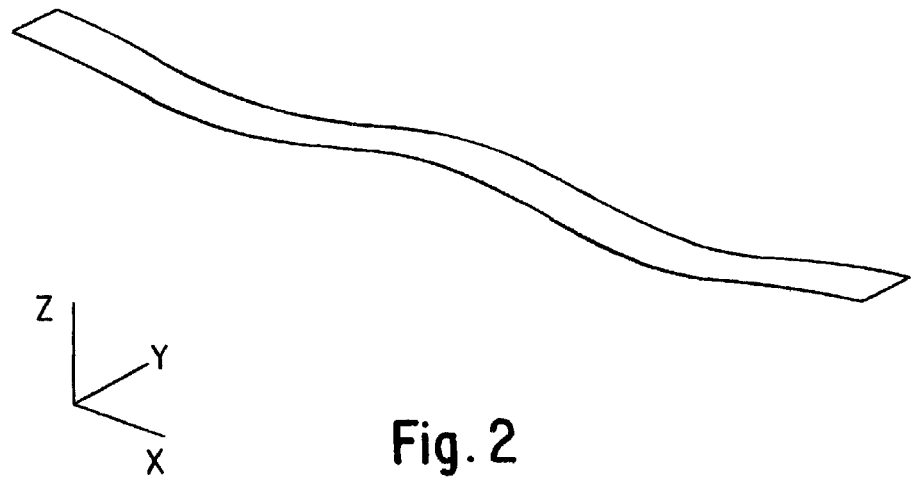
FIG. 2 is a grid form of an elastic spring element according to the invention.

Characteristics and the dimensions of a sample component according to the invention are determined in a mechanical analysis. This spring has the shape of a cosine, see FIG. 2, and can be described analytically by:

$$z = f \cdot \cos\left(2\pi \frac{x}{l}\right) = 2.5 \text{ mm} \cdot \cos\left(2\pi \frac{x}{75 \text{ mm}}\right)$$

with x as length coordinates in the range $-75 \text{ m} \leq x \leq 75 \text{ mm}$ and z as height coordinates.

The draft parameters are: length l=150 mm, width b=10 mm and laminate thickness s=1 mm. The wavelength of the spring was selected rather large as $\lambda=\frac{1}{2}=75$ mm, to achieve the greatest possible spring stroke. The amplitude chosen was f=2.5 mm, that is, the complete spring height h ("peak to valley") is 5 mm (to visualize the parameters l, b, h, s, see also FIG. 4).

One example of the spring is a spring laminate composed of 7 symmetrical layers $[(0°/90°)_n]_s$ of carbon fiber-reinforced silicon carbide (C/SiC) with a total thickness of x=1 mm. The indices in the above layered structure signify: n=number of layers, s=symmetrical structure of the layers. The effective modulus of elasticity was computed as E=70360 Mpa from the following unidirectional elastic properties of the C/SiC ceramic fiber used:

Elasticity modulus $E_1$=130000 Mpa

Elasticity modulus $E_2$=10000 Mpa

Cross contraction number $v_{12}$=0.3

Modulus of shear $G_{12}$=6800 Mpa.

For the flexure (spring stroke) w the elemental flexural mechanism (transverse beam) gives a sufficiently accurate result compared with the results of a nonlinear finite element calculation:

$$w = \frac{7}{768} \frac{12F\lambda^3}{Es^3} \text{ With } F = p\lambda.$$

wherein p is the pressure on the spring element.

Figure 3:
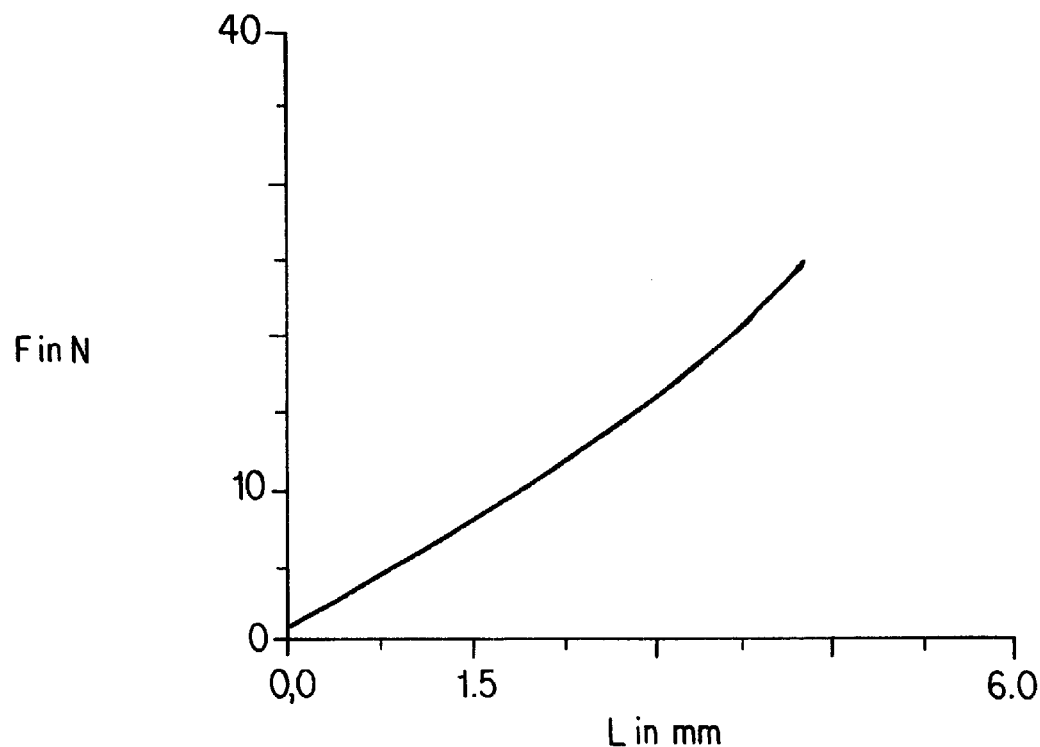
FIG. 3 is the characteristic graph of an elastic spring element according to the invention made from a C/SiC fiber ceramic at RT.

According to the above-given draft parameters, a number of corrugated spring elements were prepared and tested at room temperature (RT) and at temperatures up to 1400° C. for 1000 cycles. Up to a design maximum flexure of 2.5 mm the spring characteristic is linear, that is, up to this spring stroke the spring is completely elastic, as calculated (FIG. 3). A comparison of the spring characteristics at the beginning of the measurements and at the end show they are the same. From this it can be concluded that no creep has taken place under the thermo-mechanical stress.

Figure 4:
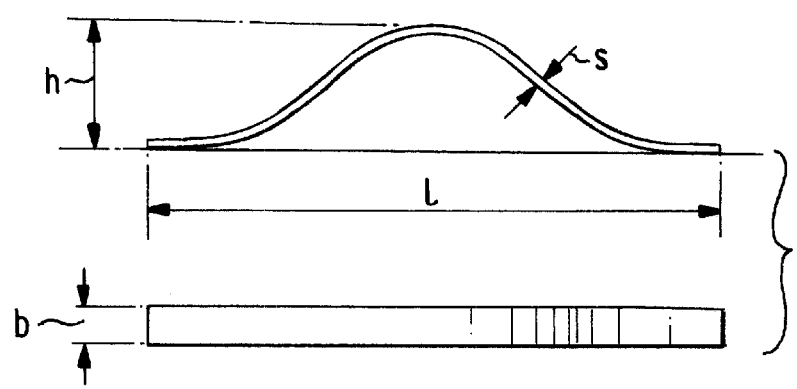
FIG. 4 is another embodiment of an elastic spring element according to the invention in various views.

FIG. 4 shows another embodiment of the elastic spring element according to the invention in a side view (above) and in a top view. Examples of values for the parameters 1, b, h, s, are:

l=95 mm b=5 mm, 8 mm, 10 mm h=3 mm, 5 mm s=1 mm

PRACTICAL EXAMPLE

The problem of sealing control surfaces, rudders, and flaps in high-speed aircraft and capsules against impinging hypersonic flow has been solved satisfactorily heretofore only up to maximum temperatures of 500° C. The space shuttle is an example. But there have still been problems due to the high thermal stress on the sealing and pressure bearing materials during the first shuttle flights and in BURAN. In the HERMES, which had to satisfy still greater thermomechanical requirements the sealing problem has not been satisfactorily solved.

Figure 1:
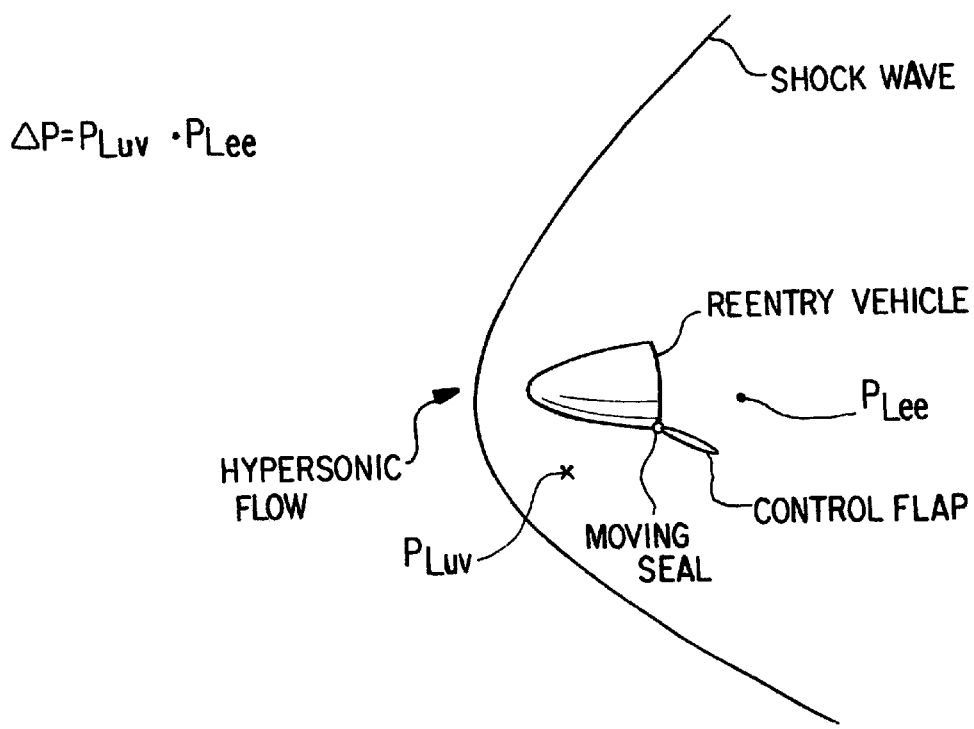
FIG. 1 is a sketch for use of a movable hot seal against hypersonic flow as explained in the introduction.

For aircraft to be reused in the future, launchers (Future Launcher), and capsules, the thermomechanical requirements to be met by a moving sealing system are still more stringent (FIG. 1). Therefore, the solution of the moving seal on rudder gaps and hot joints against the hypersonic flow by means of high-temperature resistant elastic spring elements is of outstanding importance.

Figure 5:
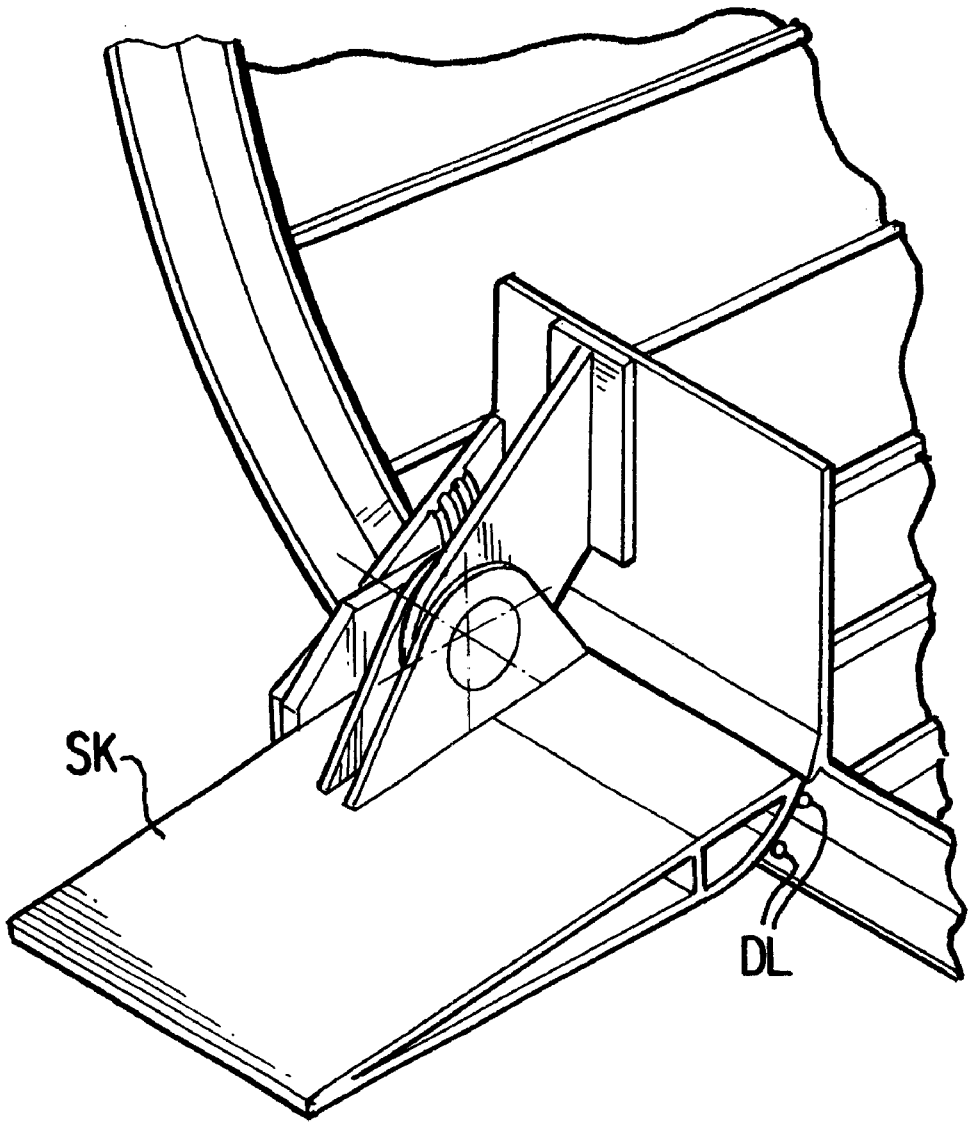
FIG. 5 is the sealing of a control flap in which the spring element according to the invention is used, FIG. 6 are cross-sectional representations of the system of FIG. 5.

FIG. 5 shows, as an example of application, a sketch of a control flap SK which is pivotally mounted on the tail of a re-entry aircraft body and seals it against the impinging hypersonic flow. The control flap SK is sealed against the tail area of the aircraft by means of sealing strips DL made of coated C/SiC ceramic material which are inserted into slots in the tail. As it is shown in FIG. 6 by the cross-sectional drawings, a spring strip F (corrugated spring) of carbon fiber ceramic acts as a spring element and forces the sealing strip against the moving sealing surface DL of cylindrical geometry on the back side of the control flap SK (FIG. 6).

Figure 6:
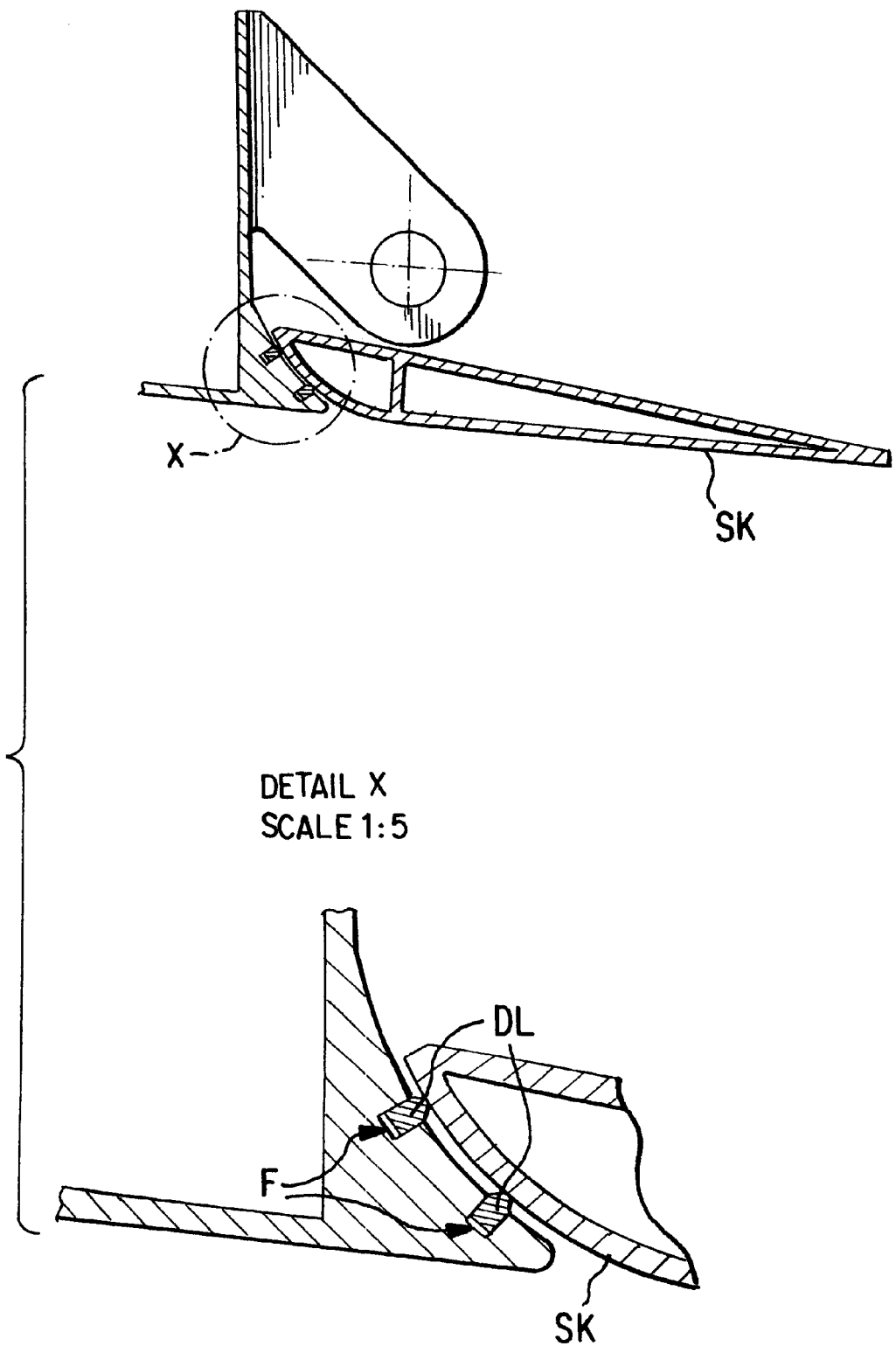

In addition to the use represented in FIGS. 5 and 6 the spring element according to the invention can be used wherever high-temperature resistant springs or pressing elements are necessary (process technology, apparatus construction, high-temperature fuel cell stacks, engine design, motor design).

What is claimed is:

1. An elastic spring element consisting of a fiber-reinforced ceramic wherein the fibers are in the form of endless fibers and wherein said elastic spring element has a corrugated geometric shape.

2. An elastic spring element according to claim 1, wherein the fiber-reinforced ceramic comprises a reinforcing fiber selected from the group consisting of carbon fibers, oxide ceramic fibers, nitride ceramic fibers, boride ceramic fibers, carbide ceramic fibers, silicide ceramic materials, and mixed ceramics formed therefrom.

3. An elastic spring element according to claim 1, wherein said elastic spring element has movable ends or is clamped at one or more ends.

4. A movable high-temperature seal having a thrusting element comprising an elastic spring element according to claim 1.

5. An elastic spring element according to claim 1, wherein the fiber-reinforced ceramic comprises a ceramic matrix selected from the group consisting of a carbon ceramic material, an oxide ceramic material, a nitride ceramic material, a boride ceramic material, a carbide ceramic material, a silicide ceramic material, and mixed ceramics formed therefrom.

6. A method for sealing a control surface against hypersonic flow at elevated temperatures, comprising providing a moving seal on the control surface, said moving seal comprising an elastic spring element consisting of a ceramic reinforced with endless fibers, wherein said elastic spring element has a corrugated geometric shape.

7. A method according to claim 6, wherein said control surface is a part of an aircraft or a capsule.

8. A method according to claim 7, wherein said part is a rudder or flap.

9. A method according to claim 6, wherein a temperature of the hypersonic flow is above 500° C.

10. A method according to claim 6, wherein a temperature of the hypersonic flow is greater than 1000° C.

* * * * *